Nov. 15, 1955     A. J. HILGERT     2,724,030
CONDITION RESPONSIVE CONTROL DEVICE
Filed May 31, 1952     2 Sheets-Sheet 1
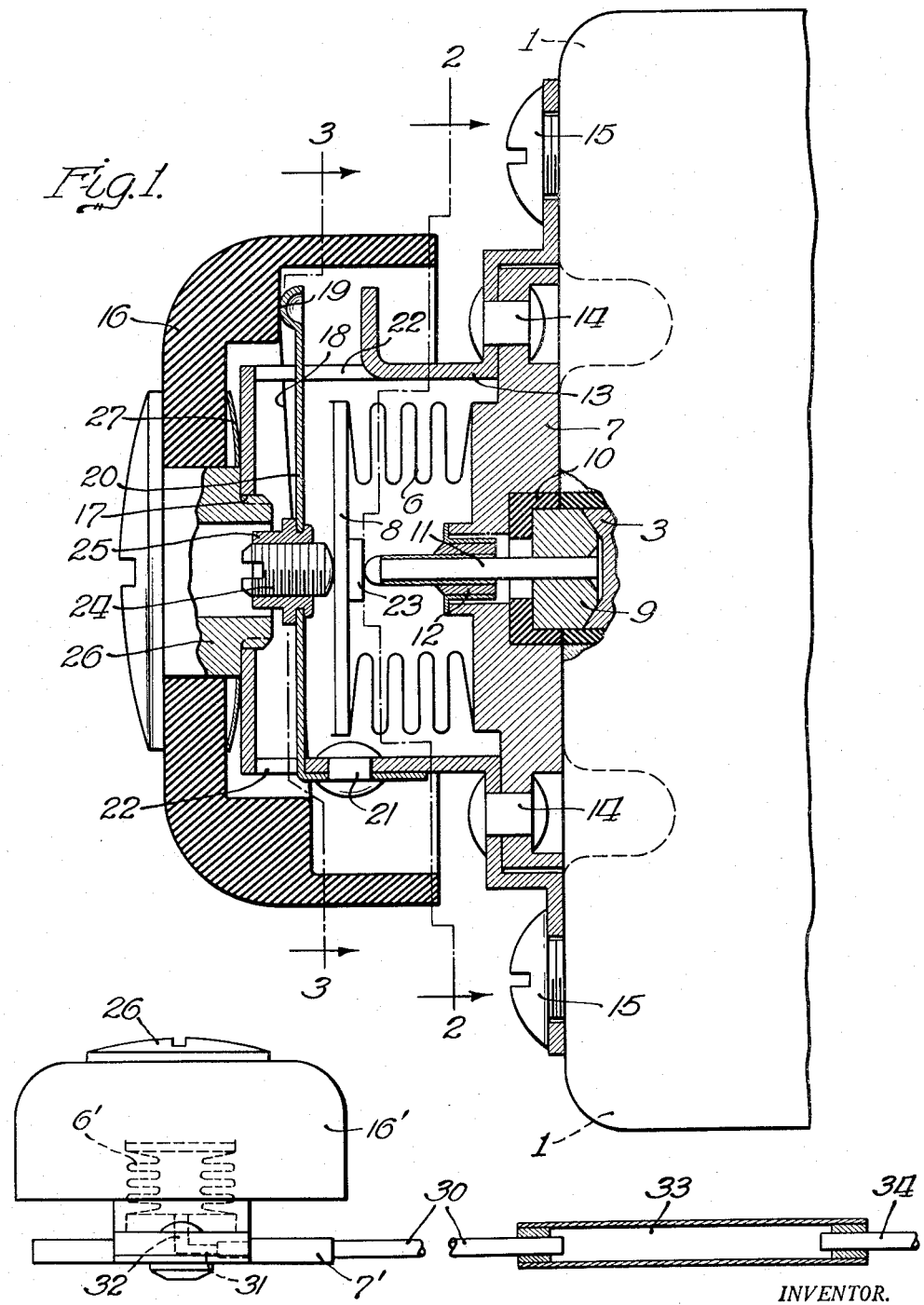
INVENTOR.
Adolph J. Hilgert

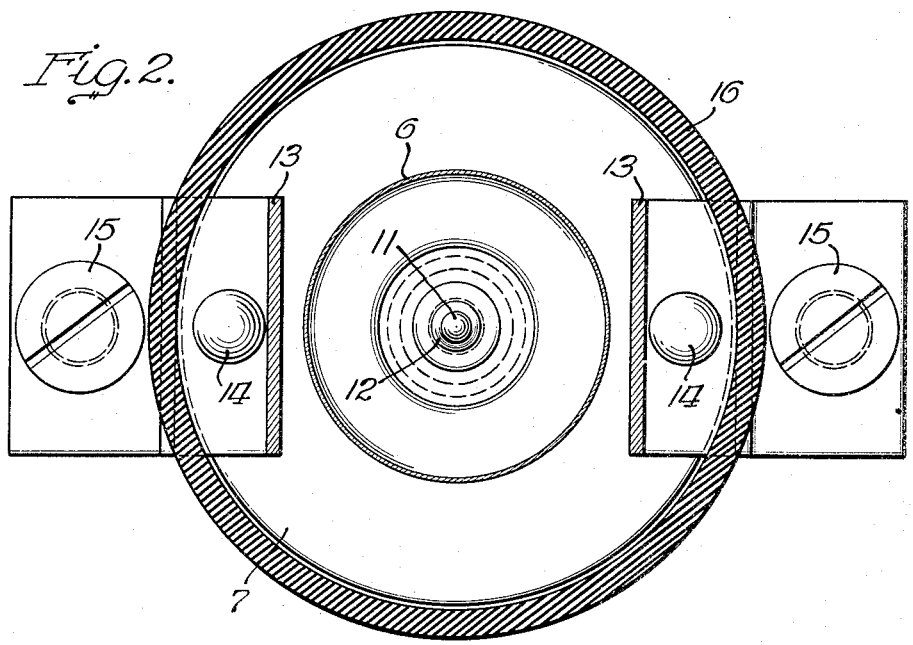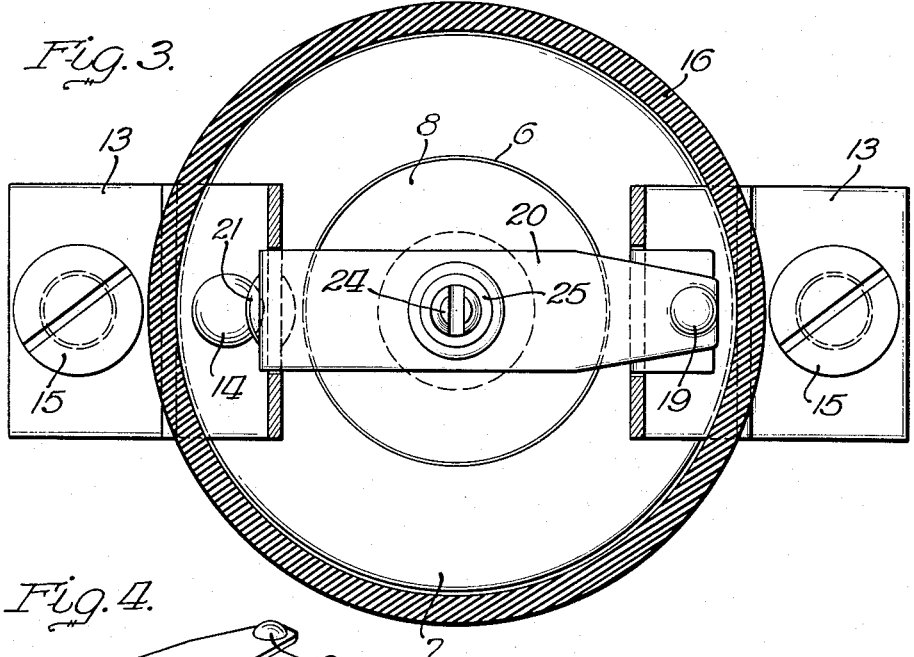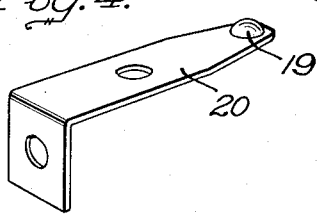

United States Patent Office 2,724,030
Patented Nov. 15, 1955

2,724,030

CONDITION RESPONSIVE CONTROL DEVICE

Adolph J. Hilgert, Milwaukee, Wis., assignor to Milwaukee Gas Specialty Company, Milwaukee, Wis., a corporation of Wisconsin Application May 31, 1952, Serial No. 291,047

25 Claims. (Cl. 200—140)

This invention relates, in general, to condition responsive control devices, and more particularly to a temperature responsive device for controlling a low voltage electric circuit as, for example, those including a thermoelectric generator as a source of electric energy, and for controlling energization of electromagnetic devices powered from such sources of electric energy.

The particular device which will be described hereinafter in connection with the drawings is particularly adapted to control of electromagnetically operated control devices of the type disclosed and claimed in the copending application of Gerald E. Dietz and Adolph J. Hilgert, Serial No. 292,488, filed June 9, 1952, and further has particular utility when employed in an electric circuit and apparatus including such control devices, as is more fully disclosed in the copending application of Adolph J. Hilgert and Russell B. Matthews, Serial No. 289,242, filed May 22, 1952. It is to be understood, however, that the present invention is not limited to this particular device or to the particular use to be described but may be embodied in other forms and used for other purposes.

One of the main objects of the present invention is to provide temperature responsive means of extremely great sensitivity and promptness of response to the medium to which it is responsive, and more particularly to provide means of the character described which will be so sensitive to temperature changes in the medium to which it is responsive as to eliminate need for "anticipating" means, but which, on the other hand, will not result in too frequent cycling of the temperature controlling apparatus with which it is employed.

Another object is to provide temperature responsive means of the character described particularly adapted to control low voltage electric circuits, for example circuits having as their source of electric energy a thermoelectric generator or the like, and more particularly means of the character described which means introduce a minimum of contact resistance into such a circuit.

Another object is to provide a temperature responsive means of the character described which when utilized in a circuit including an electromagnetic control device having an inherent differential will not, aside from the thermal lag of the temperature responsive means, contribute to the differential of the apparatus, thereby rendering such differential dependent solely upon the electric constants of the circuit.

Another object is to provide temperature responsive means in which the temperature differential of the device is determined by the thermal lag therein, and more particularly means of the character described in which mechanical contributions to the temperature differential have been substantially eliminated.

Another object is to provide temperature responsive means of the character described in which the temperature differential of the device may be independent of contact spacing and hence independent of manufacturing tolerances, and thus can be maintained constant both from device to device in production, and throughout the life of a given device regardless of contact wear and air gap.

Another object is to provide temperature responsive means of the character described in which range adjustments or temperature settings do not affect the differential of the device, the differential remaining fixed and constant.

Another object is to provide temperature responsive means which may, when employed in low voltage circuits of the character aforementioned, be employed to vary the resistance of the circuit and thus control energization of the electromagnetic or other electrical apparatus in the circuit.

Another object is to provide temperature responsive circuit controlling means of the character described which are slow-make, slow-break in operation but which nevertheless will not cause fluttering operation of electrical apparatus in the circuit during making or breaking thereof.

Another object is to provide temperature responsive circuit controlling means utilizing a bellows filled with a temperature responsive fill and in which the circuit controlling contacts may be enclosed and sealed into the bellows and immersed in the fill without danger of breakdown of the fill due to contact arcing.

Another object is to provide temperature responsive circuit controlling means which require an extremely small amount of power or movement for operation thereby rendering the means extremely sensitive to temperature change, and more particularly requiring so little movement and power that actuating bellows employing temperature responsive fills below atmospheric pressure may be utilized, thereby rendering the device fail-safe in the event of bellows leakage or rupture.

Another object is to provide an improved form of control device for easy application as a unitary temperature responsive control, for example, to the cover or body of an electromagnetic operator or to a valve body or other device as suitable or desired and which may be removed easily and as a unitary device.

Another object is to provide a temperature control device of the character set forth having exposed terminal means adapted, by the application of the device to the cover or body of an electromagnetic operator, valve or the like, to make contact with a terminal at said cover or body to place the temperature control device in circuit with the electromagnetic operator.

Another object is to provide novel, simple and improved temperature adjusting means for the temperature control device and more particularly for temperature responsive means having enclosed contacts immersed in a volatile fill.

Another object is to provide a temperature control device of the character set forth having in novel relation and coacting in a novel manner; a base plate; a flexible bellows type temperature responsive member carried by the base plate; contact means within the bellows with an extension of at least one contact extending through the base plate for contact with a terminal at the cover or body of the device to which the temperature responsive control is applied; a dial or temperature adjusting knob; and an improved form of temperature adjusting means operable by rotation of the knob to impose varying amounts of spring force against the vapor pressure generated within the bellows.

Another object is to provide a device of the character described that may be used so that it will be responsive to ambient temperature adjacent to the contact enclosure or so that it will be responsive to ambient temperature at a remote location; and more particularly a device wherein the control knob and temperature sensing part may be located at approximately the same position or separated for use at different locations, for example, at different positions relative to a space heater or the like.

Further objects and advantages and numerous adaptations of the invention will appear from the following detailed description taken in connection with the accompanying drawings showing one embodiment of the invention, it being understood that the invention is limited only within the scope of the appended claims and not to the particular embodiment selected for illustration.

In the drawings:

Figure 1 is an axial sectional view of one form of temperature control device embodying the present invention showing the same applied to the cover or body of an electromagnetic operator;

Figure 2 is a transverse sectional view taken on the line 2—2 of Figure 1;

Figure 3 is a transverse sectional view taken on the line of 3—3 of Figure 1;

Figure 4 is a perspective view of the spring lever for temperature adjustment; and Figure 5 is a view showing the temperature responsive control in elevation with a remote temperature responsive bulb applied thereto.

Referring to the drawings, the cover or body shown at 1 encloses an electomagnetic operator which may be of the form illustrated and described in the copending application of Gerald E. Dietz and Adolph J. Hilgert, Serial No. 292,488, filed June 9, 1952. The details of the electromagnetic operator may be ascertained more fully by reference to the aforementioned copending application. Suffice it for purposes of the present application to state that the cover or body 1 is provided with an outwardly exposed terminal 3 mounted in the wall of the cover or body and connected in circuit with the coil of the electromagnetic operator which is in turn connected to a source of electric current for energizing the same. The source of energy may be a source of small electric energy independent of an external source of electric current such as a single thermocouple, or a thermopile or the like.

The temperature control device comprises a hermetically sealed expansible and contractible bellows 6 closed at one end by a fixed base plate 7 and at the opposite end by a movable end plate 8. A contact tip 9 insulated from the base plate 7 by an insulator 10 has a contact stem 11 which extends into the bellows 6 from its fixed end and has a rounded inner end forming one of the contacts within the bellows. The stem 11 is insulated from the base plate 7 by a glass insulator 12.

A bracket 13 has a generally U-shaped intermediate portion which straddles the bellows 6 in generally diametrical relation. The bracket 13 is secured to the base plate 7, for example, by rivets 14 and its outer ends are apertured to receive screws 15 or the like which fasten the bracket to the outer side of the cover 1 with the contact tip 9 in good electric contact with the terminal 3.

A dial or temperature adjusting knob 16 is mounted for rotation or turning movement in the bracket 13 at 17. The knob 16 has an annular cam surface 18 which is inclined and cooperates with the free end 19 of a spring lever 20 which extends diametrically across the movable end of the bellows 6. The opposite end of the spring lever 20 is fixed to the bracket 13, for example, by a rivet 21. The bracket 13 has openings 22 through which the spring lever 20 extends. Within the bellows 6 and fixed to the movable end plate 8 at the axis thereof is a flat contact 23 which cooperates with the adjacent end of the contact stem 11. A factory adjustment screw 24 is screwed through a sleeve 25 fixed in the spring lever 20 in axial alignment with the contact 23 for factory adjustment of the device. The inner end of the bearing screw 26 which carries the knob 16, may be hollow as shown to make the adjustment screw 24 accessible. A spring washer 27 is interposed between the knob 16 and the bracket 13.

The bellows 6 is filled with a volatile fluid whose vapor pressure increases and decreases upon rise and drop in ambient temperature, for example, the temperature of the air in a room or space or the temperature of any other medium in which the thermostat is disposed.

Reference is directed to the copending application of Adolph J. Hilgert, Serial No. 265,445, filed January 8, 1952, for suitable fills for filling the bellows 6 but it is to be understood that other fills may be employed. Illustrative of the fills mentioned in the foregoing copending application are butane (which is a colorless gaseous compound—$C_4H_{10}$—of the alphatic hydrocarbon or marsh-gas series), which at 70° F. will exert a pressure of approximately 31 pounds per square inch; iso-butane, which at 70° F. will exert a pressure of approximately 45 pounds per square inch; sulphur dioxide ($SO_2$) which at 70° F. will exert a pressure of approximately 50 pounds per square inch; methyl chloride ($CH_3Cl$), which at 70° F. will exert a pressure of approximately 72 pounds per square inch; "F–12" or Freon ($CCl_2F_2$) which at 70° F. will exert a pressure of approximately 85 pounds per square inch; and propane ($C_2H_8$), which at 70° F. will exert a pressure of approximately 120 pounds per square inch. The contacts 11 and 23 are thereby at all times immersed and bathed in the volatile fluid and kept clean and out of contact with surrounding atmospheric conditions so that they will not be deleteriously affected thereby.

The temperature responsive device with its enclosed contacts 11 and 23 immersed in a volatile fill provides slow-make, slow-break contacts for use, for example, in the thermoelectric circuit of apparatus of the character illustrated and described in the hereinbefore identified copending application of Adolph J. Hilgert and Russell B. Matthews and which as utilized in such apparatus may function as a variable resistance in the thermoelectric circuit since in view of the small electric energy involved the thermoelectric circuit and hence the electromagnetically controlled valve or the like may be automatically controlled responsive to changes in temperature by merely varying the contact pressure of the contact 23 against the contact 11.

Where the device of the present application is used according to the aforementioned copending application of Adolph J. Hilgert and Russell B. Matthews, the electromagnetic operator inherently has a differential between its pick-up and drop-out values. The temperature responsive device of the present application when applied as described is in series with the electromagnetic operator for controlling the flow of electric energy supplied by a single thermocouple or other thermoelectric generator or similar source of small electric energy to the electromagnetic operator in accordance with variations in the temperature to be controlled.

In apparatus of the aforementioned character the differential required to pick-up and drop-out the electromagnetic control device, neglecting thermal lag of the temperature responsive means, is dependent solely upon the electric constants of the apparatus; that is, the pick-up and drop-out values of the electromagnetic control device in relation to the contact pressure in the condition responsive means. The inherent differential is so minimal as to be within the thermal lag of the temperature responsive device which in and of itself is much lower than in previously known devices. This is so because the differential of the temperature responsive device is not a mechanical one, as for example, inherent in snap-acting temperature responsive means necessary where higher powered circuits are involved and contacts must be broken quickly to minimize arcing. In the latter type of device, the differential not only includes manufacturing tolerances in the mechanism but also an air gap between the contacts which varies as the contacts wear in use.

Moreover, in such devices additional electric energy is necessary to supply the force necessary to overcome the snap mechanism and to power "anticipating" means which must be utilized if the apparatus is to have the required sensitivity. Such extra energy is not available from a thermocouple supplied low voltage circuit; but, on the other hand, such low voltage eliminates the necessity for snap-acting means.

It will at once become apparent that even where the temperature responsive device of the present invention is utilized in a circuit which has to be made and broken to control energization and actuation of other electrical apparatus in the circuit, the slow-make, slow-break characteristics of the present device afford the differential advantages heretofore mentioned. Since mechanical contributions to the temperature differential have been substantially eliminated from the temperature responsive device, the thermal lag thereof will be the principal differential determining factor. The thermal lag of the instant device, however, has been made so small as to render the sensitivity and promptness of response of the device substantially as fast as the rate at which the temperature of the medium to which it is responsive can be changed. In fact it has been found desirable in some cases to increase the thermal lag of the instant device to match it to such rate so that, on the one hand, anticipating means may be eliminated, while on the other hand, too rapid cycling of the temperature control apparatus does not occur.

Moreover, since mechanical contributions of the instant device to the differential thereof have been substantially eliminated the differential is unaffected by range adjustments or changes in temperature setting by movement of the knob 16, and the temperature differential of the device therefore remains fixed and constant regardless of range setting.

The enclosed contacts immersed in the volatile fill within the bellows or enclosure on one hand, by protecting the contacts and preventing oxides or other layers tending to create contact resistance, make actuation of the electromagnetic control device by a low voltage circuit possible, while on the other hand, the low voltage circuit (which eliminates arcing at the contacts when opened or when at low contact pressure permits drop-out of the electromagnetic control device) makes possible the enclosure of the contacts within the bellows or enclosure without breaking down the volatile fill.

In use the temperature differential of the instant device (neglecting negligible rate of change of vapor pressure throughout the operating temperature range) remains constant throughout the operating temperature range since the differential is independent of the relative position of the contacts and when used according to the copending application of Adolph J. Hilgert and Russell B. Matthews, is dependent only upon contact resistance as determined by contact pressure in relation to the inherent differential of the electromagnetic control device. The encapsulation of the contacts inside the bellows or enclosure assures constant resistance for given contact pressures and thus the temperature responsive means aside from the thermal lag therein does not contribute to the differential and the contact resistance if variable at all merely shifts the range of the device which may be very readily adjusted, for example, by the factory range adjustment screw 24.

While only minimal pressure changes are required for operation, the temperature responsive device of the present application is adapted to provide such minimal pressure changes and therefore permits the use of volatile fills having, for example, at normal room temperatures a pressure below atmospheric pressure (these fills have lower pressure changes per degree temperature than higher pressure fills) whereby, if a leak occurs, to break, or in any event increase the resistance of the circuit to a value at which, for example, an electromagnetic operator is deenergized so that a valve will close and shut off the flow of fuel.

Reference is directed to the copending application of John A. Wolff, Serial No. 266,626, filed January 16, 1952, for suitable sub-atmospheric fills for the bellows or enclosure for the contacts 11 and 23. Illustrative of the sub-atmospheric fills mentioned in this latter copending application are ether, methylene chloride, trichloro trifluoro ethane and isopentane; also isopropyl alcohol, for example, for 180° F. maximum setting; N-propyl alcohol for a 200° F. maximum setting, isobutyl alcohol for a 220° F. maximum setting, N-butyl alcohol for a 240° F. maximum setting, isoamyl alcohol for a 260° F. maximum setting, M-xylene for a 280° F. maximum setting, or P-cymene for a 330° F. maximum setting.

It will be apparent from the drawing and the foregoing description that the device of the present invention is adapted for ready application as a unitary structure, for example, to the cover or body of an electromagnetic operator. The cooperating contacts 11 and 23 are connected into the circuit of the electromagnetic operator by contact of the contact tip 9 with the terminal 3 upon application of the device to the body of the operator. In the illustrated embodiment of the invention, the cooperating contacts 11 and 23 complete the circuit of the electromagnetic operator by grounding the same to the cover or body 1 through the movable end plate 8, the metallic wall of the bellows 6 and the base plate 7 when the device is applied to the operator but this may vary.

Operation of the illustrated embodiment of the invention is as follows:

When the temperature, for example, of the air or other medium surrounding the bellows 6 falls below that set, for example, by the cooperation of the cam surface 18 with the spring arm 20 at the position to which the knob 16 is turned for the desired setting, the bellows contracts under the influence of the spring arm 20. The contact 23 gradually closes against contact 11 and the contact pressure builds up, for example, from about 0 pounds pressure to at least the pressure where the resistance of the thermocouple circuit, or other circuit, is reduced to a value at which the electromagnetic operator is energized by the thermoelectric energy, for example, from the thermocouple (about 20 millivolts is generated by the heat of a pilot burner flame on one form of single thermocouple now marketed by Milwaukee Gas Specialty Company, assignee of the present application) and actuates the valve or other controlling member to the desired position.

Upon rise of the order of a few tenths of a degree Fahrenheit or less in temperature at the temperature responsive means above that set by the knob and cooperation of the cam surface 18 with the spring arm 20, the bellows 6 expands and reduces the pressure of the contact 23 against the contact 11 at least to where the resistance of the circuit is increased to a value where the electromagnetic operator is deenergized and a valve or other controlling member is actuated to closed or other desired position.

With, for example, silver contacts, a contact pressure of only a few grams reduces the contact resistance to a very low value. The relation between contact pressure and contact resistance will vary for different shapes of contacts and for various contact materials.

Where it is desired to make the temperature responsive device responsive to variations in temperature at a remote location, a capillary tube 30 of a length to extend to the desired position may be inserted into the base plate 7', as shown in Figure 5, into position opening through passages 31 and 32 in the base plate into the interior of the bellows 6'. The opposite end of the tube 30 opens into one end of a temperature sensing bulb 33 which may be positioned at the desired remote location. A fill tube 34 opens into the opposite end of the bulb 33 for filling the bulb 33, capillary tube 30 and bellows 6' with the desired volatile fluid.

The embodiments of the invention shown in the drawings are for illustrative purposes only and it is to be expressly understood that said drawings and the accompanying specification are not to be construed as a definition of the limits or scope of the invention, reference being had to the appended claims for that purpose.

I claim:

1. A condition responsive device comprising a hermetically sealed enclosure having a movable end and expansible and contractible in response to changes in a condition, a fixed base plate at the opposite end of said enclosure and adapted for attachment to the body of an electromagnetic device and for electrical grounding to said body by said attachment, and a pair of cooperating contact means within said enclosure one movable with said movable end and the other having an extension projecting through said fixed base plate for contact with a terminal on the body of the electromagnetic device for completing by application of said base plate to said body an electric circuit from the terminal on said body to said base plate through said cooperating contact means and the wall of said expansible and contractible enclosure.

2. A condition responsive device comprising a hermetically sealed enclosure having a movable end and expansible and contractible in response to changes in a condition, a fixed base plate at the opposite end of said enclosure and adapted for attachment to the body of an electromagnetic device and for electrical grounding to said body by said attachment, a pair of cooperating contact means within said enclosure one movable with said movable end and the other having an extension projecting through said fixed base plate for contact with a terminal on the body of the electromagnetic device for completing by application of said base plate to said body an electric circuit from the terminal on said body to said base plate through said cooperating contact means and the wall of said expansible and contractible enclosure, and temperature adjusting means cooperating with the movable end of said enclosure.

3. A condition responsive device comprising a hermetically sealed enclosure having a movable end and expansible and contractible in response to changes in a condition, a fixed base plate at the opposite end of said enclosure and adapted for attachment to the body of an electromagnetic device and for electrical grounding to said body by said attachment, a pair of cooperating contact means within said enclosure one movable with said movable end and the other having an extension projecting through said fixed base plate for contact with a terminal on the body of the electromagnetic device for completing by application of said base plate to said body an electric circuit from the terminal on said body to said base plate through said cooperating contact means and the wall of said expansible and contractible enclosure, a spring arm fixedly held at one end and extending across and cooperating with the movable end of said enclosure, and a temperature adjusting knob having a cam surface cooperating with the opposite end of said spring arm for varying by rotation of said knob the force applied to the movable end of the enclosure by said spring arm.

4. A condition responsive device comprising a hermetically sealed enclosure having a movable end and expansible and contractible in response to changes in a condition, a fixed base plate at the opposite end of said enclosure and adapted for attachment to the body of an electromagnetic device and for electrical grounding to said body by said attachment, a pair of cooperating contact means within said enclosure one movable with said movable end and the other having an extension projecting through said fixed base plate for contact with a terminal on the body of the electromagnetic device for completing by application of said base plate to said body an electric circuit from the terminal on said body to said base plate through said cooperating contact means and the wall of said expansible and contractible enclosure, a spring arm fixedly held at one end and extending across and cooperating with the movable end of said enclosure, a temperature adjusting knob having a cam surface cooperating with the opposite end of said spring arm for varying by rotation of said knob the force applied to the movable end of the enclosure by said spring arm, and a screw having screwed support on said spring arm and cooperating with the movable end of the enclosure for factory adjustment of the device.

5. A thermostat comprising a hermetically sealed enclosure having a movable end and expansible and contractible in response to changes in temperature, a fixed base plate at the opposite end of said enclosure and adapted for attachment to the body of an electromagnetic device, and a pair of cooperating contact means within said enclosure one movable with said movable end and the other having an extension projecting through said fixed base plate for contact with a terminal on the body of the electromagnetic device for completing by application of said base plate to said body an electric circuit from the terminal on said body to said base plate through said cooperating contact means and the wall of said expansible and contractible enclosure.

6. A thermostat comprising a hermetically sealed enclosure having a movable end and expansible and contractible in response to changes in temperature, a fixed base plate at the opposite end of said enclosure and adapted for attachment to the body of an electromagnetic device and for electrical grounding to said body by said attachment, a pair of cooperating solid contacts within said enclosure one movable with said movable end and the other extending through said fixed base plate for contact with a terminal on the body of the electromagnetic device for completing by application of the base plate to the body an electric circuit from the terminal on said body to said base plate through said cooperating contacts and the wall of said expansible and contractible enclosure, a bracket carried by said base plate and straddling said enclosure, a temperature adjusting knob carried for rotation on said bracket, and means coacting with said knob and with the movable end of the enclosure for applying a variable force to the movable end of the enclosure for temperature adjustment.

7. A thermostat comprising a hermetically sealed enclosure having a movable end and expansible and contractible in response to changes in temperature, a fixed base plate at the opposite end of said enclosure and adapted for attachment to the body of an electromagnetic device and for electrical grounding to said body by said attachment, a pair of cooperating solid contacts within said enclosure one movable with said movable end and the other extending through said fixed base plate for contact with a terminal on the body of the electromagnetic device for completing by application of the base plate to the body an electric circuit from the terminal on said body to said base plate through said cooperating contacts and the wall of said expansible and contractible enclosure, a bracket carried by said base plate and straddling said enclosure, a spring arm fixed at one end to said bracket and extending across the movable end of the enclosure, and a temperature adjusting knob carried for rotation on the outer end of said bracket and having a cam surface cooperating with the opposite end of said spring arm for varying by rotation of said knob the force applied to the movable end of the enclosure by said spring arm.

8. A thermostat comprising a hermetically sealed enclosure having a movable end and expansible and contractible in response to changes in temperature, a fixed base plate at the opposite end of said enclosure and adapted for attachment to the body of an electromagnetic device and for electrical grounding to said body by said attachment, a pair of cooperating solid contacts within said enclosure one movable with said movable end and the other extending through said fixed base plate for contact with a terminal on the body of the electromagnetic device for completing by application of the base plate to said body an electric circuit from the terminal on said body to said base plate through said cooperating contacts and the wall of said expansible and contractible enclosure, a bracket carried by said base plate and straddling said enclosure, a spring arm fixed at one end to said bracket and extending along the movable end of the enclosure, a temperature adjusting knob carried for rotation on the outer end of said bracket and having a cam surface cooperating with said spring arm for varying by rotation of said knob the force applied to the movable end of the enclosure by said spring arm, and a screw having screwed support on said spring arm and cooperating with the movable end of the enclosure for factory adjustment of the device.

9. A thermostat comprising a hermetically sealed enclosure having a movable end and expansible and contractible in response to changes in a condition, a fixed base plate at the opposite end of said enclosure and adapted for attachment to the body of an electromagnetic device and for electrical grounding to said body by said attachment, a pair of cooperating solid contacts within said enclosure one movable with said movable end and the other extending through said fixed base plate for contact with a terminal on the body of the electromagnetic device for completing by application of the base plate to said body an electric circuit from the terminal on said body to said base plate through said cooperating contact means and the wall of said expansible and contractible enclosure, a bracket carried by said base plate and straddling said enclosure, a spring arm fixed at one end to said bracket and extending along the movable end of the enclosure, a temperature adjusting knob carried for rotation on the outer end of said bracket and having a cam surface cooperating with said spring arm for varying by rotation of said knob the force applied to the movable end of the enclosure by said spring arm, and a spring washer interposed between said bracket and said knob.

10. A thermostat comprising a hermetically sealed enclosure having a movable end and expansible and contractible in response to changes in temperature, a fixed base plate at the opposite end of said enclosure and adapted for attachment to the body of an electromagnetic device and for electrical grounding to said body by said attachment, a pair of cooperating solid contacts within said enclosure one movable with said movable end and the other extending through said fixed base plate for contact with a terminal on the body of the electromagnetic device for completing by application of the base plate to said body an electric circuit from the terminal on said body to said base plate through said cooperating contacts and the wall of said expansible and contractible enclosure, a bulb for positioning at a remote location, and a tube connecting said bulb in communication with the interior of said enclosure.

11. A thermostat according to claim 10 wherein the connecting tube is connected to the base plate and communicates with the interior of the enclosure through a passage in said base plate.

12. A condition responsive circuit controlling device adapted for use in a low voltage circuit comprising, in combination, a hermetically sealed enclosure expansible and contractible in response to changes in the condition, cooperating low resistance metal contacts within said enclosure and movable with respect to each other directly and continuously with expansion and contraction of said enclosure, said contacts being normally in engagement within the range of control of said device and having the contact pressure varied by expansion and contraction of said enclosure to vary the contact resistance and thereby the current flow in said low voltage circuit, and a fill for said enclosure in which said contacts are immersed to maintain the latter clean and free of films tending to create contact resistance.

13. A temperature responsive circuit controlling device having a fixed and constant differential determined substantially entirely by the thermal lag of the device comprising, in combination, a hermetically sealed expansible and contractible enclosure having a fill responsive to changes in temperature, cooperating low resistance metal contacts carried by said enclosure and sealed therein, said contacts being normally in engagement within the range of control of said device and movable with respect to each other to vary the contact pressure directly and continuously with expansion and contraction of said enclosure.

14. A condition responsive circuit controlling device for controlling low voltage circuits having a fixed and constant differential comprising, in combination, a hermetically sealed enclosure expansible and contractible in response to changes in the condition, cooperating low resistance metal contacts carried by said enclosure and sealed therein, said contacts being normally in engagement within the range of control of said device and movable with respect to each other to vary the contact pressure continuously and directly with expansion and contraction of said enclosure for variation of the contact resistance when electric energy flows in said circuit, and a fill sealed in said enclosure with said contacts in which the latter are immersed to maintain the contacts free of films tending to vary contact resistance, thereby rendering the latter minimal and of substantially constant value for given contact pressure throughout the life of the device.

15. A temperature responsive circuit controlling device having a fixed and constant differential comprising, in combination, a hermetically sealed enclosure expansible and contractible in response to changes in the condition, cooperating low resistance metal contacts carried by said enclosure and sealed therein, adjustable means tending to oppose expansion of said enclosure for setting the temperature at which the device operatively controls the circuit, said contacts being normally in engagement within the range of control of said device and movable with respect to each other to vary the contact pressure directly and continuously with expansion and contraction of said enclosure, thereby rendering the differential of the device constant and unaffected by changes in setting of said temperature adjustment means.

16. A condition responsive circuit controlling device having a fixed and constant differential comprising, in combination, a hermetically sealed enclosure expansible and contractible in response to changes in the condition, cooperating low resistance metal contacts carried by said enclosure, adjustable means tending to oppose expansion of said enclosure for setting the control point thereof, said contacts being normally in engagement within the range of control of said device and movable with respect to each other to vary the contact pressure directly and continuously with expansion and contraction of said enclosure thereby eliminating mechanical contribution to the differential of the device and rendering the differential thereof unaffected by setting of said adjustable means.

17. A condition responsive circuit controlling device having a fixed and constant differential comprising, in combination, a hermetically sealed enclosure expansible and contractible in response to changes in the condition, cooperating low resistance metal contacts carried by said enclosure, adjustable means tending to oppose expansion of said enclosure for setting the control point thereof, said contacts being normally in engagement within the range of control of said device and movable with respect to each other to vary the contact pressure directly and continuously with expansion and contraction of said enclosure thereby eliminating mechanical contribution to the differential of the device and rendering the differential thereof unaffected by setting of said adjustable means, said contacts being sealed into said enclosure to maintain the contacts substantially free of films tending to vary the contact resistance thereof, any variation in such resistance affecting only the control point and not the differential of the device, and means for calibrating the control point to compensate for variations in contact resistance.

18. A slow-make, slow-break condition responsive circuit controlling device having a fixed and constant differential comprising, in combination, an enclosure expansible and contractible in response to small changes in said condition, cooperating circuit controlling low resistance metal contacts carried by said enclosure and sealed therein, said contacts being normally in engagement within the range of control of said device and movable with respect to each other and directly and continuously with expansion and contraction of said enclosure for variation of the contact pressure thereof for control of the circuit, thereby rendering such control independent of contact spacing, wear, and air gap to provide a differential for the device which is fixed and constant throughout the life of the device.

19. A slow-make, slow-break condition responsive device for controlling low voltage circuits comprising, in combination, an enclosure expansible and contractible in response to small changes in said condition, cooperating low resistance metal contacts carried by said enclosure and sealed therein, said contacts being normally in engagement within the range of control of said device and movable with respect to each other directly and continuously with expansion and contraction of said enclosure for variation of the contact pressure and hence contact resistance of the contacts, said contact resistance being variable by small movements of said enclosure through a range of resistance values which effectively control flow of current through said circuit.

20. A condition responsive circuit controlling device comprising, in combination, an enclosure expansible and contractible in response to changes in said condition, cooperating low resistance metal contacts carried by said enclosure and sealed therein, the contact pressure of said contacts being variable with expansion and contraction of said enclosure for control of said circuit and rendering such control subject to very small movements of said enclosure in response to changes in said condition, and a condition responsive fill sealed into said enclosure, said fill under operating conditions having a pressure below that of the atmosphere so that upon leakage or rupture of the enclosure the contact pressure of said contacts will be reduced to interrupt flow of current through said circuit, thereby rendering the device fail-safe in operation.

21. A temperature responsive control device for controlling a low voltage circuit comprising temperature responsive means for varying the resistance of said circuit, said temperature responsive means comprising encapsulated low resistance contacts, and contact pressure varying means for varying by changes in temperature the contact resistance and thereby the current flow in said circuit by a low and constant range of contact pressure variations, said contact resistance being variable through the range of control of said device.

22. A condition responsive device comprising a hermetically sealed enclosure having a movable wall and expansible and contractible in response to changes in the condition, a pair of cooperating contacts within said enclosure relatively movable toward and away from each other with the expansion and contraction of said enclosure, a spring arm supported at one end and extending adjacent said movable wall, said spring arm having abutment means engageable with said wall, and a control point adjusting knob having a cam surface coacting with said spring arm to cause the latter to exert an adjustable amount of force on said movable wall.

23. A thermostat comprising a hermetically sealed enclosure expansible and contractible in response to changes in temperature and having a movable wall and a fixed wall, cooperating contacts within said enclosure fixed to said fixed and movable walls respectively, a bracket fixed with respect to the fixed wall of said enclosure, a spring arm supported at one end on said bracket and extending across the movable wall of said enclosure, said spring arm having abutment means engageable with said movable wall, and a temperature control point adjustment knob mounted for rotation on said bracket and having a cam surface coacting with said spring arm to cause the latter to exert an adjustable amount of force on said movable wall.

24. A thermostat comprising a hermetically sealed enclosure expansible and contractible in response to changes in temperature and having a movable wall and a fixed wall, cooperating low resistance contacts within said enclosure fixed to said fixed and movable walls respectively, a bracket fixed with respect to the fixed wall of said enclosure, a spring arm fixed at one end to said bracket and extending across the movable wall of said enclosure, an abutment member having adjustable support on said spring arm and coacting with said movable wall, and a temperature control point adjustable knob mounted for rotation on said bracket and having a cam surface coacting with said spring arm to cause the latter to exert an adjustable amount of force on said movable wall.

25. A condition responsive circuit controlling device adapted for use in a low voltage circuit comprising, in combination, a horizontal sealed enclosure expansible and contractible in response to changes in the condition, cooperating low resistance metal contacts within said enclosure fixed respectively to relatively movable portions of said enclosure and movable with respect to each other directly and continuously with expansion and contraction of said enclosure, and means for adjusting the control point of said device without disturbing the fixed relationship between said contacts and the portions of the enclosure to which they are fixed comprising adjustable means tending to oppose expansion of said enclosure.

References Cited in the file of this patent

UNITED STATES PATENTS

| Number | Name | Date |
|---|---|---|
| 243,345 | Lungen | June 21, 1881 |
| 360,823 | Singer | Apr. 5, 1887 |
| 1,265,765 | Ferris | May 14, 1918 |
| 1,822,408 | King | Sept. 8, 1931 |
| 1,877,482 | Ruben | Sept. 13, 1932 |
| 1,972,675 | Beebe | Sept. 4, 1934 |
| 1,985,337 | Bondurant | Dec. 25, 1935 |
| 2,069,222 | Cremer | Feb. 2, 1937 |
| 2,230,277 | Volker et al. | Feb. 4, 1941 |
| 2,318,480 | Griffith | May 4, 1943 |
| 2,420,548 | Mackay et al. | May 13, 1947 |
| 2,541,643 | Dusinberre et al. | Feb. 13, 1951 |
| 2,566,704 | Leibing | Sept. 4, 1951 |
| 2,620,630 | Bitzer | Dec. 9, 1952 |